(12) United States Patent
Ilias et al.

(10) Patent No.: US 6,168,714 B1
(45) Date of Patent: Jan. 2, 2001

(54) FLUX-ENHANCED CROSS-FLOW MEMBRANE FILTER

(75) Inventors: Shamsuddin Ilias, Greensboro; Sirena C. Hargrove, Kittrell; Miles E. Talbert, Trinity, all of NC (US)

(73) Assignee: North Carolina A&T University, Greensboro, NC (US)

( * ) Notice: Under 35 U.S.C. 154(b), the term of this patent shall be extended for 0 days.

(21) Appl. No.: 09/312,472

(22) Filed: May 17, 1999

(51) Int. Cl.⁷ ................................................. B01D 65/02
(52) U.S. Cl. ............................... 210/321.69; 210/195.2; 210/424; 210/433.1
(58) Field of Search ........................... 210/637, 321.65, 210/321.69, 739, 416.1, 195.2, 196, 650, 420, 424, 433.1

(56) References Cited

U.S. PATENT DOCUMENTS

| | | |
|---|---|---|
| 3,819,513 | * 6/1974 | Ishii et al. . |
| 4,814,086 | * 3/1989 | Bratt . |
| 4,921,610 | * 5/1990 | Ford et al. . |
| 5,034,121 | * 7/1991 | Budin et al. . |
| 5,202,254 | * 4/1993 | Amiot et al. . |
| 5,690,829 | * 11/1997 | Lauer . |

OTHER PUBLICATIONS

Journal of Membrane Science, 34 (1987) 267–281 "Membrane Fouling In A constant–flux Ultrafilration Cell" by Turker et al.
Desalination, 68 (1988) 77–92 "Terminology for Pressure–Driven Membrane Operations" by V. Gekas.
Separation Science and Technology, vol. 25 (1990) 1307–1324 "Potential Applications of Pulsed Flow for Minimizing Concentration Polarization in Ultrafilration" by Shamsuddin Ilias et al.
Biotechnology and Bioengineering, vol. 38 (1991) 688–696 "Properties of Microfilration Membranes: Flux Loss During Constant Pressure Permeation of Bovine Serum Albumin" by Bowen et al.
Journal of Membrane Science, 81 (1993) 127–137 "Dean vortices with wall flux in a curved channel membrane system" by Brewster et al.
Desalination, 91 (1993) 65–108 "The effect of protein fouling in microfiltration and ultrafiltration on permeate flux, protein retention and selectivity: A literature review" by Marshall et al.
Journal of Membrane Science, 96 (1994) 1–58 "The behavior of suspensions and macromolecular solutions in cross–flow microfiltration" by Belfort et al.
Elsevier Science Ltd., An International Newsletter–Membrane Technology, 1996/2 No. 70 "Treating upland surface water with a novel low–fouling membrane".
Technomic Publishing Co., Inc. Ultrafiltration and Microfiltration Handbook, copyright 1998, Munir Cheryan.

* cited by examiner

Primary Examiner—Matthew O. Savage
Assistant Examiner—Richard W. Ward
(74) Attorney, Agent, or Firm—Rhodes & Mason, P.L.L.C.

(57) ABSTRACT

A filtration system for a cross-flow membrane filter which reduces the deleterious effects of concentration polarization and membrane fouling, thereby increasing the average transmembrane flux. The filtration system includes a feed supply for providing a feed solution; a feed pump connected to the feed supply; a cross-flow membrane filter connected downstream of the feed pump for separating the feed into a permeate and a retentate, the cross-flow membrane filter including at least two membrane ports and at least two permeate outlets; a valve manifold assembly located between the feed pump and the cross-flow membrane filter; and a control system for controlling the valve manifold to selectively reverse the flow of the feed through the cross-flow membrane filter. Periodic reversal of the direction of flow of the feed stream in the membrane module, while maintaining the cross-flow, keeps the system in a hydrodynamically transient state and prevents the formation of an undesirable stable boundary layer at the membrane surface thereby increasing the average transmembrane flux.

19 Claims, 8 Drawing Sheets

FLUX-ENHANCED CROSS-FLOW MEMBRANE FILTER

BACKGROUND OF THE INVENTION (1) Field of the Invention

The present invention relates generally to filtration and, more particularly to an improved cross-flow membrane filtration process.

(2) Description of the Prior Art

The existence of many substances as solutions or mixtures created the need for processes to be developed to separate these solutions or mixtures. In this context, the need to purify, recover, isolate, and remove substances in process streams in chemical, pharmaceutical, food, petroleum, and wastewater applications has driven investigations in separation technology. In recent years, membrane-based cross-flow filtration has gained importance in many separation applications and, in some situations, competes with traditional separation technologies, such as distillation, absorption, and extraction.

The most common cross-flow membrane processes are microfiltration (MF), ultrafiltration (UF), and reverse osmosis (RO). The primary differences between these processes relates to the size and/or the molecular weight of the feed component to be separated. These processes are pressure-driven and are used for separation of macromolecules from a solvent, typically water. Examples of typical applications along with typical operating pressures are shown in Table 1 below.

TABLE 1

| Pore Size | Molecular Weight | Applied Pressure Range | Typical Uses | Membrane Process |
|---|---|---|---|---|
| 100 μm | | 1–20 psig (0.1–1.5 atm) | Pollen | Micro-filtration |
| 10 μm | | | Starch Blood Cells Typical Bacteria | |
| 1 μm | | | Smallest Bacteria | |
| 1000 Å | | | DNA, Virus | |
| 100 Å | 100,000 MW | | Albumin | Ultra-filtration |
| | 10,000 MW | 20–100 psig (1.5–7 atm) | Vitamin $B_{12}$ | |
| | 1,000 MW | | Glucose | |
| 1 Å | | 500–1500 psig (35–100 atm) | Water $Na^+$ $Cl^-$ | Reverse Osmosis |

For small transmembrane pressures, the membrane flux is proportional to pressure. The term "membrane flux" refers to the flow volume over time per unit area of membrane (ml/min/sq.meter). However, as the pressure of the flow into the membrane is increased, the flux reaches an asymptotic value beyond which a further increase in pressure does not contribute to any increase in the flux.

By varying the transmembrane pressure difference driving force and average pore diameter, the membrane in the MF, UF and RO processes may serve as a selective barrier by permitting certain components of a mixture to pass through while retaining others. This results in two phases, permeate and retained phases, each of which is enriched in one or more of the components of the mixture.

Some of the obstacles to the successful use of membrane separation processes are phenomena known as concentration polarization and fouling. Concentration polarization occurs when a concentration gradient of the retained components is formed at or near the membrane surface. Fouling is the deposition of material, referred to as foulant, on the membrane surface or in its pores, leading to a change in membrane behavior or even complete plugging of the membrane. These phenomena manifest themselves over time by increased operating pressure whereby the permeate flux reaches an asymptotic value beyond which further increases in operating time and pressure do not result in increased flux. The severity of the effects of these phenomena varies with the membrane type and the composition of the process stream.

Concentration polarization is a function of the hydrodynamic conditions in the membrane system. Membrane fouling is usually characterized as irreversible; however, when cross-flow membranes are used, the imposed stress of the cross-flow tends to shear the foulant layer. Hence, varying the fluid mechanics of a system is very important in maximizing the total capacity of a membrane module.

In the past, attempts have been made to manipulate the fluid hydrodynamics or membrane surface morphology to enhance transmembrane flux. However, these attempts have provided only limited success.

The effect of membrane surface modification by chemical and physical means has been investigated. The principle behind the idea of chemical modification is that it might reduce attractive forces or increase repulsive forces between the solute and membrane. However, this method has been found to have little effect on the behavior of suspended particles once a secondary cake has been established. Physical modification is achieved by using protuberances designed to induce instabilities in the bulk flow. Protrusions are placed on the membrane surface at defined intervals in such applications. This technique has the disadvantage of diminishing the useful surface area of the membrane. Additionally, this technique causes high axial pressure drops and can be difficult to scale up.

Techniques to modify fluid hydrodynamics of the bulk stream have also been investigated. Such modifications include the periodic induction of a pressure gradient on the feed stream. It has been found that the advantage of using pulsation overcomes the disadvantage of increased power consumption. However, the problems of energy dissipation and reduced cross-flow, which results in a lower net filtering capacity, remain.

Finally, fluid instabilities due to flow in curved ducts, known as Taylor and Dean flows, have been used to disturb the flux-limiting effects of concentration and fouling. The problems associated with this and other similar external devices are the high energy required to operate the devices, the difficulty to repair them, and the difficulty to scale them up.

Thus, there remains a need for a new and improved cross-flow membrane filtration process which provides a substantial improvement in flux-enhancement while, allowing automatic operation.

SUMMARY OF THE INVENTION

The present invention relates to a filtration system which reverses the feed flow in the cross-flow membrane filter to reduce the deleterious effects of concentration polarization and membrane fouling, thereby increasing the average transmembrane flux. The present invention changes the hydrodynamics of typical membrane systems by periodically reversing the direction of flow of the feed stream to the membrane. Periodic reversal of the direction of flow of the feed stream in the membrane module, while maintaining the cross-flow, has been found to keep the system in a hydrodynamically transient state and to prevent the formation of an undesirable stable boundary layer at the membrane surface. Therefore, the collection of particles in a gradient near the membrane surface and particle deposition on the membrane surface are slowed. Unlike backpulsing, in which the permeate stream is periodically forced back through the membrane module permeate outlet under the impetus of an induced pressure gradient, the feed flow direction itself is reversed from time to time through the filter without the need for an auxiliary pump, loss of pure permeate back through the filter or the possibility of stressing and breaking the membrane.

Accordingly, one aspect of the present invention is to provide a filtration system including: a feed supply for providing a feed solution; a feed pump connected to the feed supply; a cross-flow membrane filter connected downstream of the feed pump for separating the feed into a permeate and a retentate; and a valve manifold assembly located between the feed pump and the cross-flow membrane filter for selectively reversing the flow of the feed through the cross-flow membrane filter.

Another aspect of the present invention is to provide a filtration system including: a feed supply for providing a feed solution; a feed pump connected to the feed supply; a cross-flow membrane filter connected downstream of the feed pump for separating the feed into a permeate and a retentate, the cross-flow membrane filter including at least two membrane ports and at least two permeate outlets; and a valve manifold assembly located between the feed pump and the cross-flow membrane filter for selectively reversing the flow of the feed through the cross-flow membrane filter.

Still another aspect of the present invention is to provide a filtration system including: a feed supply for providing a feed solution; a feed pump connected to the feed supply; a cross-flow membrane filter connected downstream of the feed pump for separating the feed into a permeate and a retentate, the cross-flow membrane filter including at least two membrane ports and at least two permeate outlets; a valve manifold assembly located between the feed pump and the cross-flow membrane filter; and a control system for controlling the valve manifold to selectively reverse the flow of the feed through the cross-flow membrane filter.

These and other aspects of the present invention will become apparent to those skilled in the art after a reading of the following description of the preferred embodiment when considered with the drawings.

DESCRIPTION OF THE PREFERRED EMBODIMENTS

Figure 1:
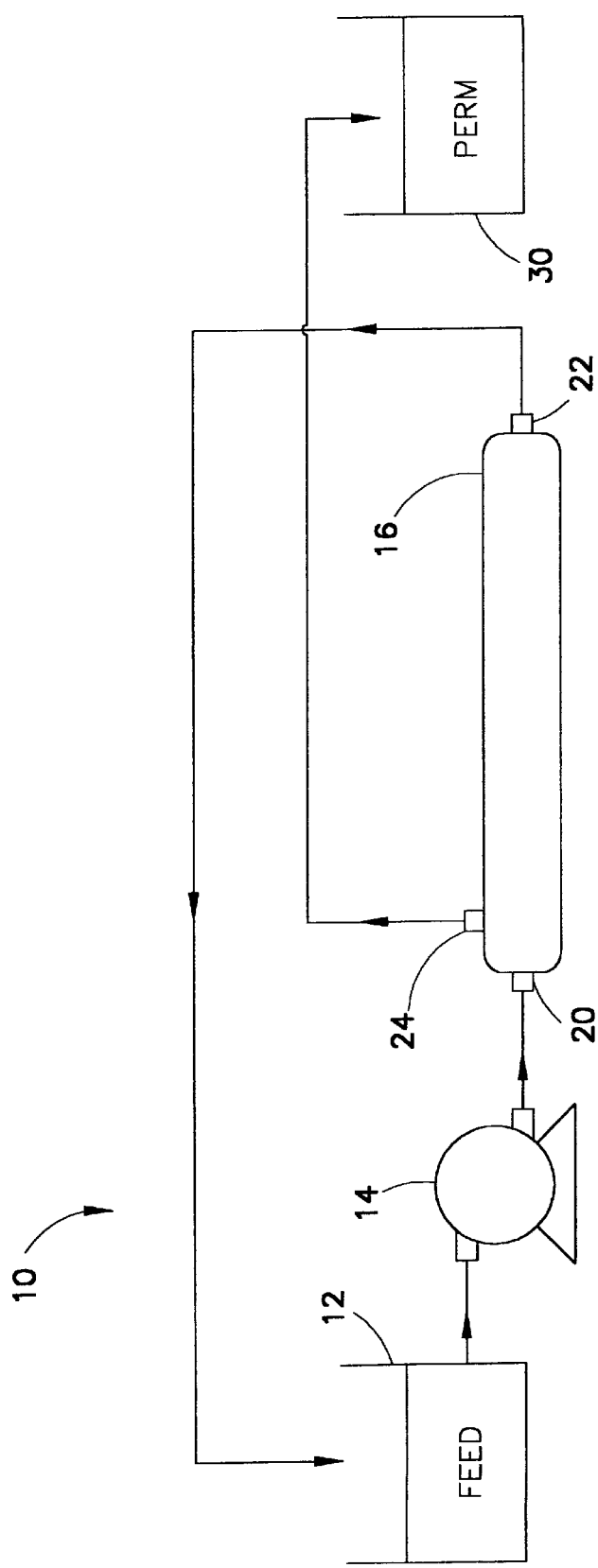
FIG. 1 is a schematic diagram illustrating a typical cross-flow membrane filter constructed according to the prior art invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a typical cross-flow membrane filter is shown. The filter system includes a feed supply 12 connected to a pump 14 for providing a pressurized feed stream to cross-flow membrane filter 16. The feed fluid enters through port inlet 20 and exits through exit port 22. It is then returned to feed supply 12 and pumped through cross-flow membrane filter 16 again. The difference in pressure across the membrane surface allows the permeate to pass through and out of permeate outlet 24. The permeate is then collected in receptacle 30. It is known in the art to backpulse this arrangement by applying a high pressure stream of material to the permeate outlet 24 in a direction opposite that of normal permeate flow. After the backpulsing operation is complete, flow is then resumed in the same direction from inlet port 20 to exit port 22. The process has some disadvantages as will be discussed hereinbelow.

Figure 2A:
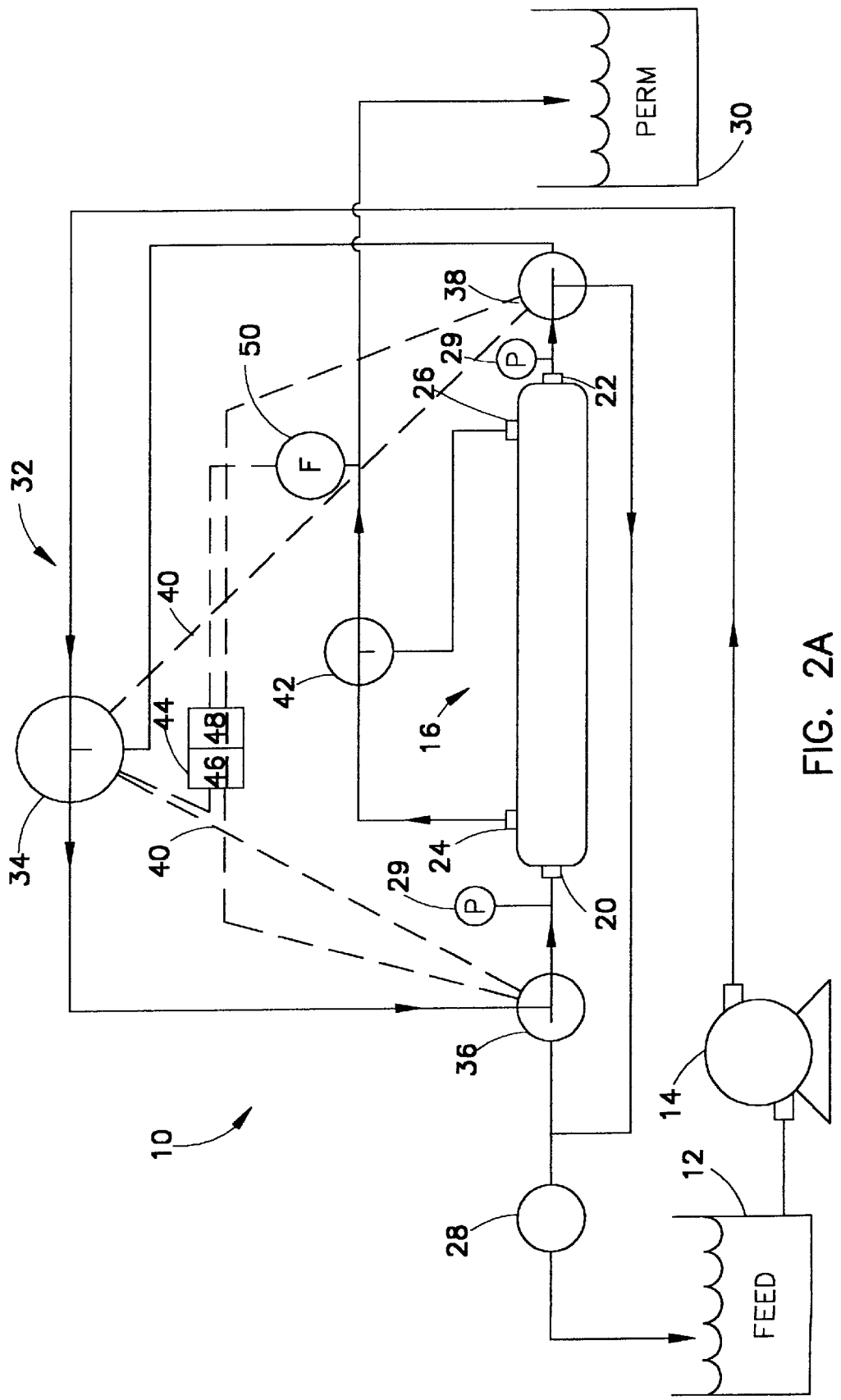
FIG. 2A is a schematic diagram illustrating a cross-flow membrane filter constructed according to the present invention configured for feed flow from left to right.
Figure 2B:
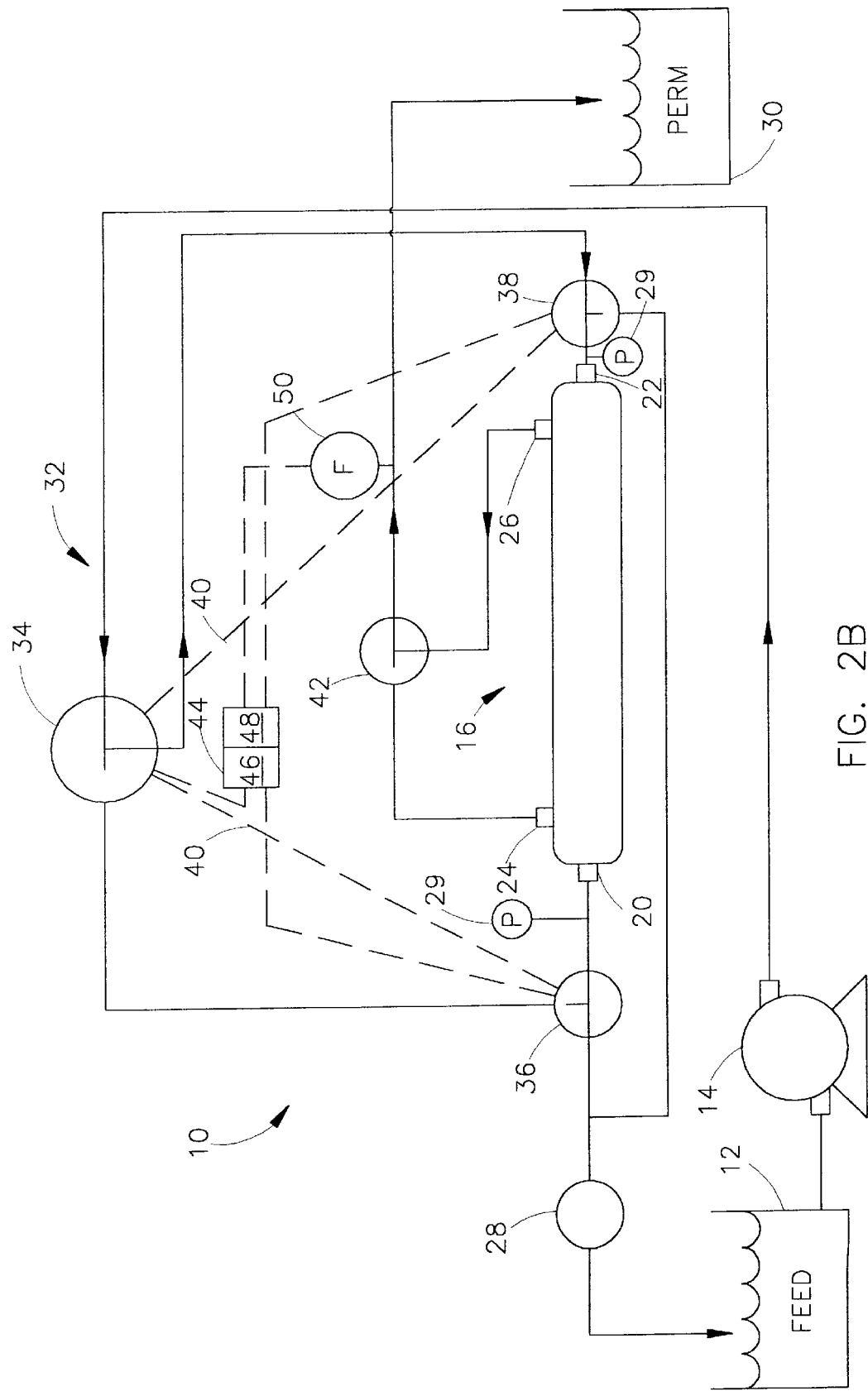
FIG. 2B is a schematic diagram illustrating a cross-flow membrane filter constructed according to the present invention configured for feed flow from right to left.
Figure 3:
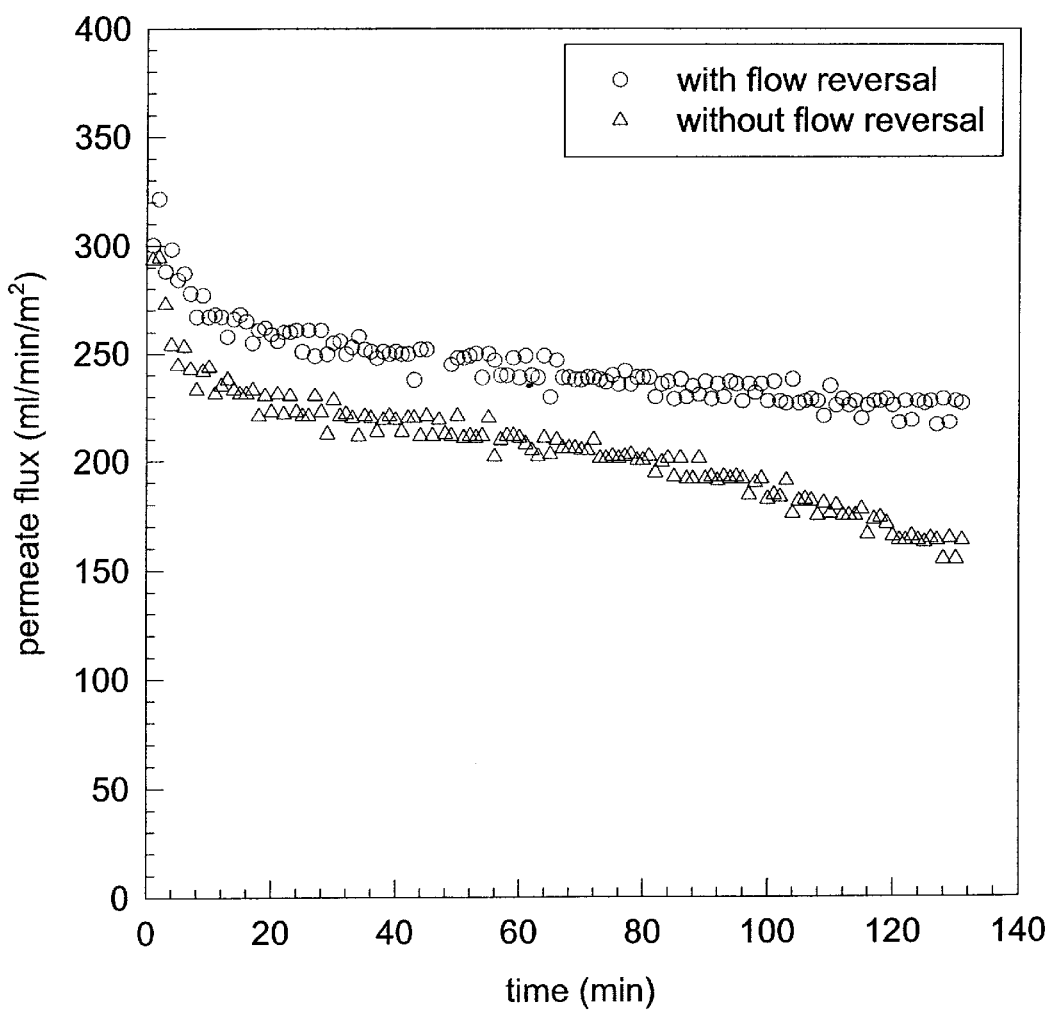
FIGS. 3–6 are graphic comparisons of the performance of flow reversal filtration to that without flow reversal.

As best seen in FIGS. 2A and 2B, a flux enhanced, cross-flow membrane filter system, generally designated 20, is shown constructed according to the present invention. The filter system 20 includes five major sub-assemblies: a feed supply 12; a feed pump 14; a cross-flow membrane filter 16; a valve manifold assembly 32; and a control system 44 for controlling the valve manifold assembly to selectively reverse the direction of the feed flow and the permeate flows through the cross-flow membrane filter.

Like the prior art filter shown in FIG. 1, the filter system of the present invention includes a feed supply 12, which includes at least two components of different molecular sizes, connected to a feed pump 14 for providing a pressurized feed stream to cross-flow membrane filter 16. The feed solution enters through port 20 and exits through port 22. The retentate is then returned to feed supply 12 and pumped through cross-flow membrane filter 16 again. The difference in pressure across the membrane surface allows the permeate to pass through the membrane and out of port 24. The permeate is then collected in receptacle 30. It will be appreciated by one of ordinary skill that the permeate may be returned to the feed supply 12 if it is desired to increase the concentration of one of the components in the feed supply.

In the preferred embodiment, the feed pump 14 is a positive displacement pump adapted to generate a discharge pressure sufficient to provide a retentate backpressure sufficient to ensure proper filtration. One suitable piston, positive-displacement pump is manufactured by Fluid Metering, Inc. This pump is equipped with a variable-speed pump head and controller to vary the flow rates. A pressure relief valve 28 is used to regulate the pressure and the corresponding pressure is measured by a plurality of pressure gauges 29 near each axial port 20,22.

The cross-flow membrane filter 16 is preferably outfitted with at least two permeate outlets 24,26. One of the permeate outlets is located adjacent one of the cross-flow membrane filter ports 20,22 and the other one of the permeate outlets is located adjacent to the other of the cross-flow membrane filter ports. A suitable filter is available as a membrane module from A/G Technology of Nedham, Mass. Other types of membrane designs may be used in the practice of the present invention to include plate and frame, spiral-wound, or other similar configurations where permeate flow is normal to feed solution flow.

According to the present invention, the valve manifold assembly 32 includes a primary directional valve assembly 34 and at least two secondary directional valve assemblies 36, 38. Each of the at least two secondary directional valve assemblies is located between the primary directional valve assembly 32 and one of the membrane ports 20, 22 of the cross-flow membrane filter.

In the preferred embodiment, the primary and secondary valve assemblies 34,36,38 are individual multiple position valves. However, an equivalent function of those valves could be provided by a plurality of single position valves. The selection of an appropriate valve approach is within the ability of one of ordinary skill. Also in the preferred embodiment, a common valve operating shaft or linkage, illustrated schematically at 40, couples the primary directional valve assembly to at least one of the secondary directional valve assemblies, such that the operation of the primary directional valve assembly causes a corresponding operation of the secondary valve assembly.

Finally, a tertiary valve assembly 42 may be located between the plurality of permeate outlets 24,26 and the permeate receptacle 30 whereby the plurality of permeate outlets may be selectively connected to the permeate receptacle. It should be understood that the tertiary valve assembly 42 is not part of the valve manifold assembly. Rather, the tertiary valve assembly 42 serves to route the permeate exiting the membrane 16 from the permeate outlets 24, 26 to the permeate receptacle 30. Although the tertiary valve assembly 42 is depicted as a single multiple-position valve, an equivalent function could be provided by a plurality of individual valves.

In the preferred embodiment, a control system 44 is connected to the valve manifold assembly 32 to selectively reverse the flow of the feed through the cross-flow membrane filter 16. The control system 44 may include a plurality of valve actuators 46, 48 for operating a valve in the valve manifold assembly 32. The control system 44 operates the valve manifold assembly in response to a predetermined process set point. The set point may be a predetermined time for feed flow across the membrane in a selected direction or a predetermined permeate flux level. The permeate flux level may be measured downstream from the cross-flow membrane filter using a flowmeter 50 which is also in communication with controller 44.

In operation, the feed supply material 12 is provided via pump 14 to the primary valve assembly 34 which then routes the feed supply to one of the secondary valve assemblies 36, 38 as appropriate. In a first flow direction as illustrated in FIG. 2A, the feed travels from the primary valve assembly 34 to secondary valve assembly 36 where it is routed into one of the filter ports 20. The feed travels the length of the filter from left to right as shown in the figure with the permeate exiting through permeate outlet 24 and the retantate exiting via filter port 22 and returning to the feed supply through back pressure valve 28. The permeate is fed by tertiary valve assembly 42 to the permeate receptacle 30.

After a predetermined amount of time controller 44 shifts the positions of the primary and secondary valve assemblies 34, 36, 38 to provide a reverse flow in a second direction opposite to that of the first direction as illustrated in FIG. 2B. Here, the feed supply material 12 is provided via pump 14 to primary valve assembly 32 which routes the feed material to port 22. It can be seen that each of the ports 20, 22 may act as either an outlet port or an inlet port depending on the direction of feed flow through the cross flow membrane filter 16 after traveling through the membrane filter 16 in the direction right to left. The feed is divided into a retentate and a permeate. The retentate exits via port 20 and travels through back pressure valve 28 to the feed supply 12. The permeate leaves the membrane filter 16 via permeate outlet 26 and is routed by tertiary valve assembly 42 to permeate receptacle 30. It will be readily appreciated that after the passage of a predetermined length of time, the positions of the valves and the valve manifold will be changed so as to reverse the flow through the membrane system 16 to that shown in FIG. 2A.

The method the present invention includes varying the time between flow reversals as needed depending on the decay in permeate flux through the membrane filter 16. The flow reversal times described herein are exemplary only for a laboratory experiment. In full scale installations, the time period between flow reversal will vary depending on the number of factors to include the nature of the feed supply, the type of membrane filter structure used and system operating pressure, temperature, flow rate. Initiating a flow reversal may be controlled by controller 44 responsive to an input from flow meter 50. When permeate flux as evidenced by the flow out of the membrane filter 16 has decreased to a predetermined point, the flow reversal may be initiated.

The present invention can be best understood by a review of the following examples:

The present invention was tested using the ultrafiltration of bovine serum albumin (BSA) in aqueous solution as a model feed. BSA was selected since it is known that in the ultrafiltration of BSA, both concentration polarization and deposition on the front face of the membrane as foulant are prevalent and predictable. Accordingly, BSA solutions were prepared by dissolving appropriate amounts of Bovine Albumin Fraction V Powder in distilled water. Complete solution homogeneity was facilitated by stirring each sample on a stir plate until no solids were present in the liquid. Each solution was freshly prepared immediately before each experimental run. For these preliminary experimental runs, the pH of the feed solution was not controlled by adding any buffers. To cover a wide range of feed concentrations, 0.01, 0.1, 0.5, 1, and 5 wt % BSA solutions were used.

Experiments were conducted using a polysulfone UF membrane with a nominal molecular weight cut-off of 3000, manufactured by A/G Technology. The membrane module had an effective length of 12.4 in. and contained 13 fibers, each with an internal diameter of 1 mm. A retentate backpressure of between about 20 psig and about 30 psig was maintained during the experimental trials. The membrane was maintained to avoid false data due to membrane deterioration by following the manufacturer's cleaning procedure. The cleaning procedure includes flushing with clean water, buffer, or saline solution at 50° C.; circulation of 0.5 N NaOH solution at 50° C. for 1 h, and a final flushing with clean, warm water. The effectiveness of this cleaning procedure was evaluated by determining the pure water flux over a 10-min period both prior to and after each experimental run. For each comparison, the pure water flux data were comparable within 10% with occasional improvements in the membrane performance. These fluctuations in the membrane performance can be attributed to slight temperature changes in the membrane water bath and some membrane compaction over time. By the time the final pure-water flux data was taken, the membrane had deteriorated only slightly less than 12.5%.

Following each experimental run, a sample was taken from the permeate reservoir for analysis to determine the remaining BSA concentration following UF. Sigma Diagnostics Procedure No. 631 was used. In short, each sample was mixed with Sigma Albumin Reagent (BCG) to facilitate a color change, and a spectrophotometer was then used to determine the absorbency of the sample at a wavelength of 628 nm. Absorbencies were also determined for a "blank" using distilled water and a standard sample of a BSA solution of known concentration. The albumin concentration of the sample was then determined according to the relationship:

$$C_S = \frac{A_s - A_b}{A_{ref} - A_b} \times C_{ref}$$

wherein $C_s$=concentration of the sample;
$C_{ref}$=concentration of the standard solution;
$A_s$=absorbency of the sample
$A_b$=absorbency of the blank; and
$A_{ref}$=absorbency of the reference solution.
All concentrations are in wt %.

The rejectivity (%) of BSA by the membrane can be calculated using the following equation:

$$\beta = (1 - C_p/C_o) \times 100$$

wherein:

$\beta$=the solute rejectivity of the membrane;
$C_p$=is the concentration of the permeate; and
$C_o$=is the concentration of the feed.

The solute concentration (BSA) in the permeate was not detectable by the Spectrophotometer. Accordingly, it was assumed that the membrane had nearly 100 percent solute rejectivity.

Cross-flow UF experiments were performed with BSA as feed solution over a concentration range of 0.01 wt. % to 5 wt. % under flow reversal and unidirectional flow conditions. A single membrane module was used for the experiments reported here. Before each experimental run, the membrane module was thoroughly cleaned to restore the membrane. Flux data for pure water were then collected and compared with the initial data. There was a gradual decline in the flux for pure water over a long period of operation. Each of the UF experimental runs with and without flow reversal were conducted for slightly more than 2 hours to study the transmembrane flux behavior.

Figure 4:
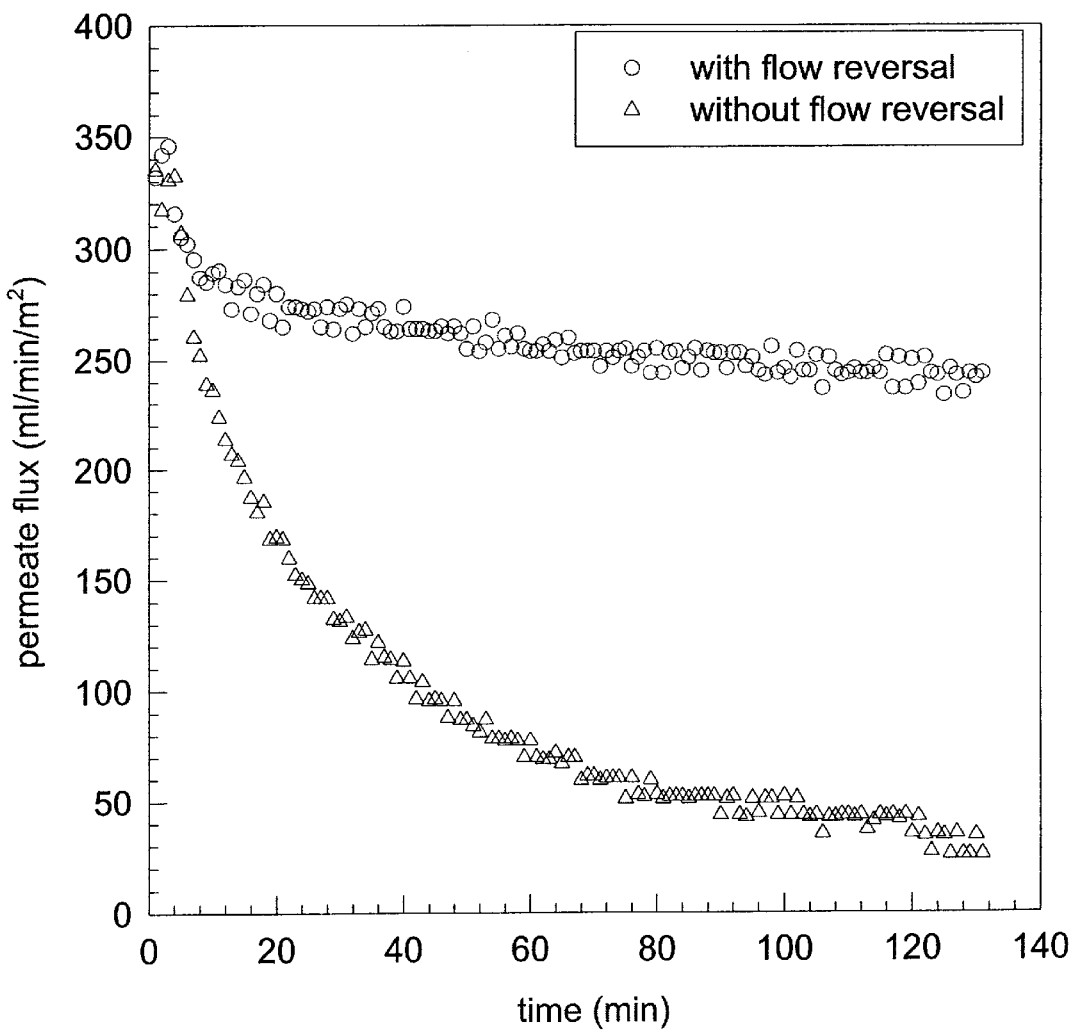
Figure 5:
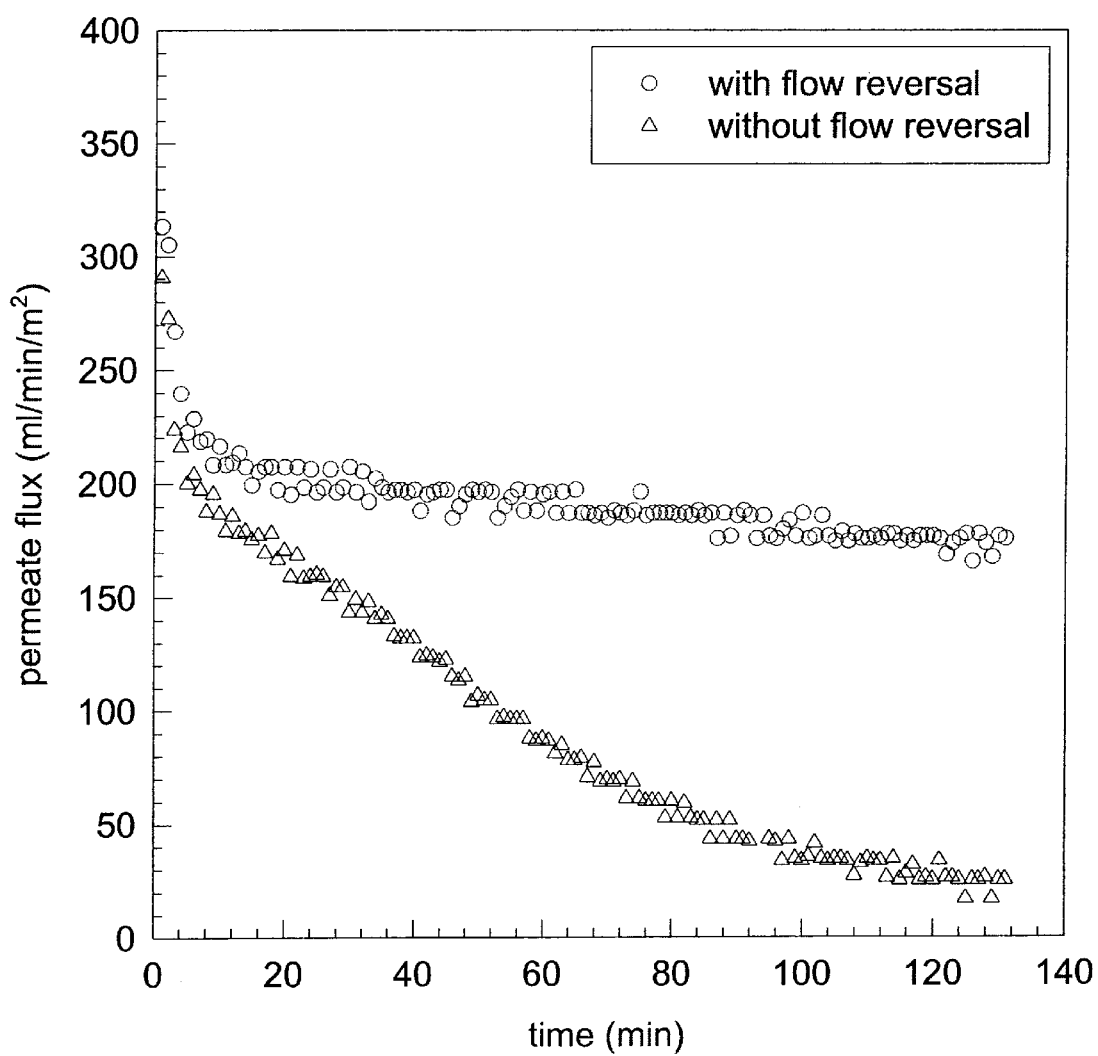
Figure 6:
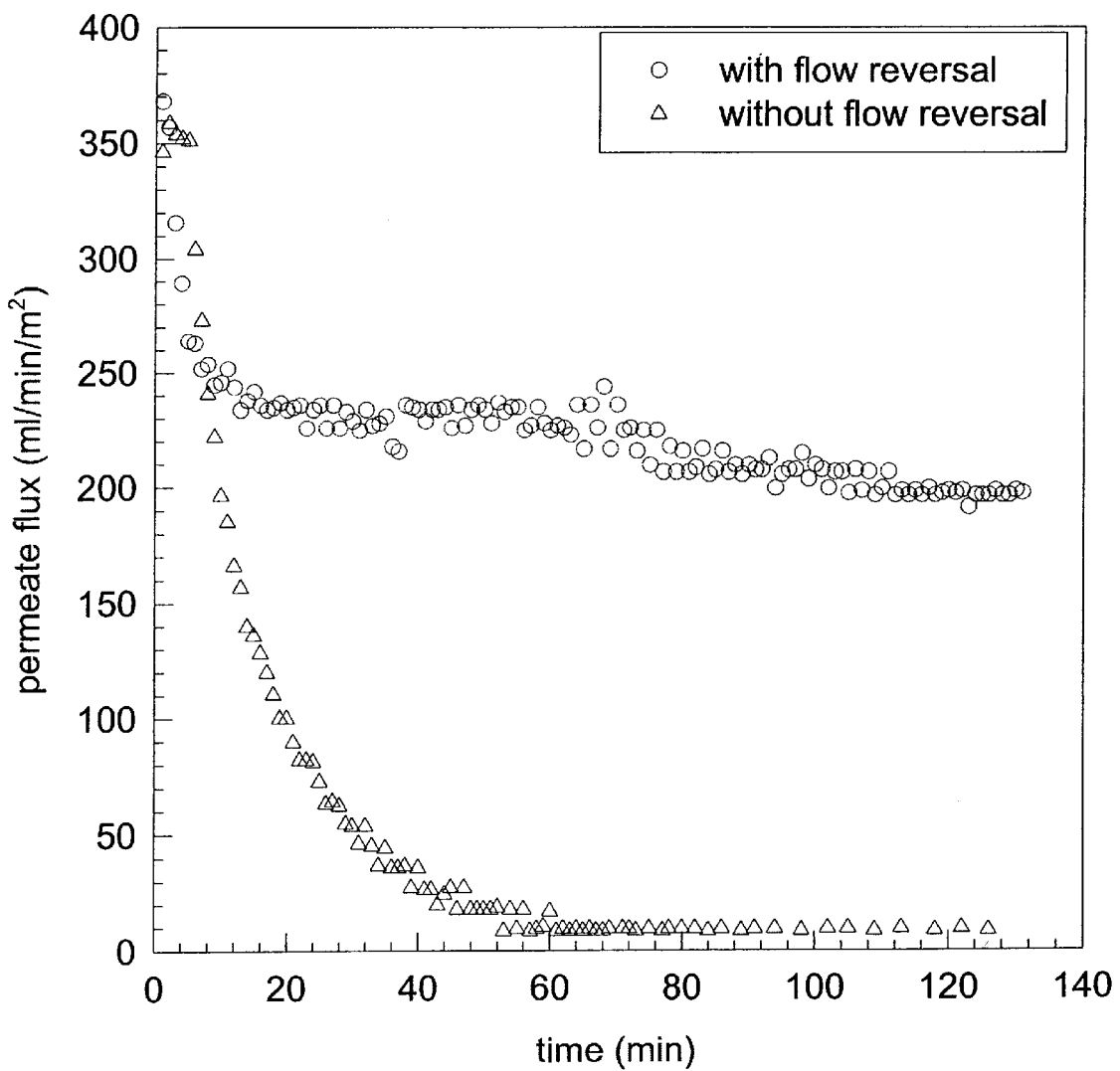

FIGS. 3–6 illustrate the benefits of the present invention. As can be seen, there was a distinct performance improvement with flow reversal for a 1.0 wt % BSA solution at 25 psig (See FIG. 3). Turning to FIG. 4, the improvement was dramatic. The flow reversal approach exhibited significantly less degradation in permeate flux. Similar results were seen for at 3.0 wt % BSA solution at 25 psig (FIG. 5) and at 30 psig (FIG. 6).

Figure 7:
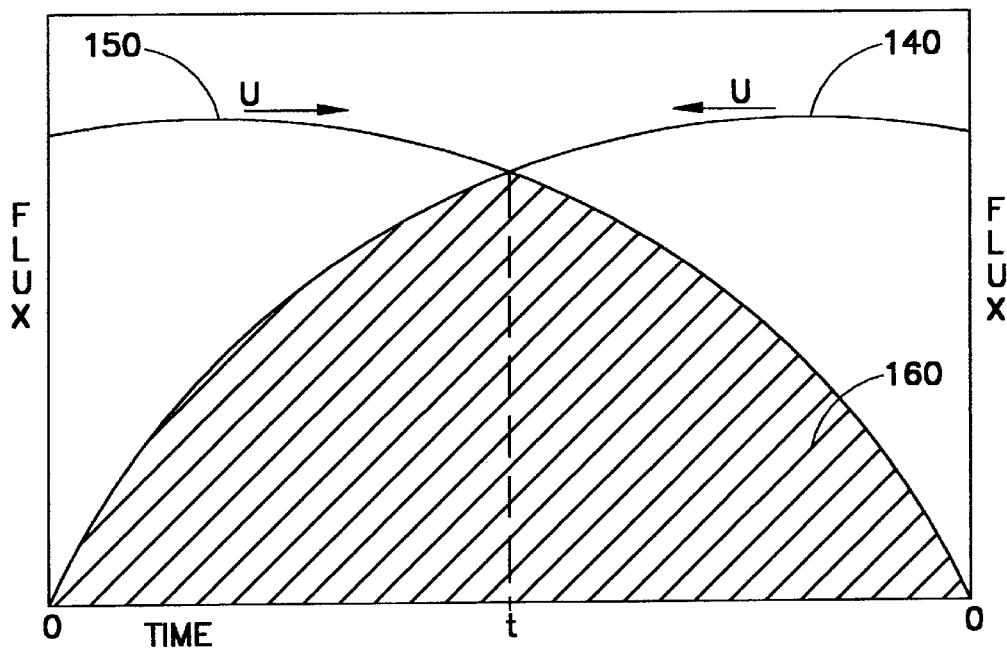
FIG. 7 is a graphical representation of the principle of operation of the present invention.

A possible explanation for the unexpected improvement is shown in FIG. 7. This Figure illustrates graphically, the increase in wall concentration of the feed solution as a function of membrane axial distance for a typical cross-flow membrane. Curve 140 shows the affects of concentration polarization and fouling on membrane performance as the feed solution travels in a first direction through the membrane module. Curve 150 shows the same effect as the feed solution travels in a second direction through the membrane. The area under each of these curves is indicative of the scope of the problem addressed by the present invention. With feed reversal the membrane is exposed to the area 160 represented by the intersection of those two curves. It will be readily appreciated that the flow reversal of the present invention extends significantly the amount of operating time before an equivalent amount of fouling is attained using single direction flow.

The graph in FIG. 7 illustrates the method for improving the permeate flux of a cross-flow membrane filter of the present invention. The method includes establishing a first flow in a first direction through said cross-flow membrane filter as illustrated curve 150. Next, the first flow is reversed after a predetermined time "t" to a second flow direction opposite that of said first flow direction as represented by curve 140. These flow reversal steps are then repeated until the permeate flux through said cross flow membrane filter reaches an unacceptable level. In a preferred embodiment the predetermined time is determined by monitoring the flow rate of the permeate passing through said cross-flow membrane filter. The value of the time "t" cannot be stated generally but will vary depending on the various factors discussed herein above.

Figure 8:
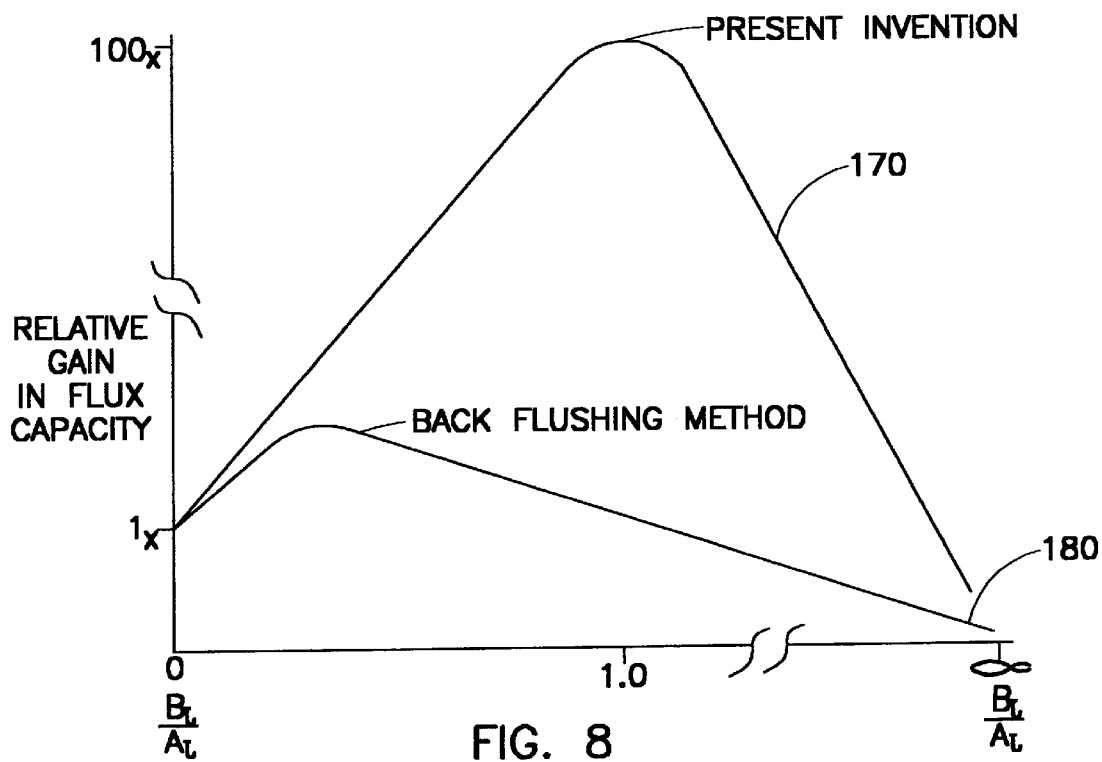
FIG. 8 is a graphical representation of the benefits of the present invention.

Turning now to FIG. 8, the benefits of the present invention as compared to prior art backpulsing methods are illustrated. The horizontal axis of the graph plots the ratio of the amount of time that feed flow travels in a first direction, $B_t$, compared to the amount of time that the feed flow travels in a opposing second direction, $A_t$. It will be readily appreciated that the ratio of $B_t$ to $A_t$ of 1 means that feed flow travels in opposing directions in equal amount of time. As this ratio approaches infinity, the flow travels in the first direction nearly all of the time. As this ratio approaches 0, then the flow travels only in the second direction and not in the first direction. It will be appreciated that a ratio of 0 represents prior art, single flow direction filtration systems.

FIG. 8 shows a plot of this ratio described above against relative gain and flux capacity. Curve 170 illustrates relative gain achieved by the present invention and curve 180 illustrates the relative gain using prior art backpulsing approaches. It is expected that the present invention will provide its maximum relative gain at a ratio of flow direction of about 1. The relative gain from backpulsing increases initially and then decreases substantially as the drawbacks of system down time are factored into the flux capacity determination.

The filtration process of the present invention provides a number of advantages over the prior art methods of addressing the problems described above with concentration polarization and fouling. These advantages include, but are not limited to, the fact that the filtration process need not be interrupted as often for a physical cleaning, typically by back flushing, of the membrane. The resulting longer periods of continuous filtration system operation dramatically increase the efficiencies of filtration systems employing the present invention. The filtration process of the present invention can be expected to run continuously during a given time span. Conversely, a prior art system that relies on back flushing will not be available for operation during that entire time. Systems relying on back flushing must be shut down periodically to permit a cleaning fluid of some type to be pumped into the permeate outlets of the membrane module. Typically, this process requires additional capital equipment in the form of additional pumps, valves and lines. Moreover, operators must be careful that during the back flushing process, no damage is done to the membrane. The additional capital investment and the loss of system operating time result in a much lower efficiency for systems relying on back flushing than those relying on the process of the present invention.

It should be understood that all such modifications and improvements have been deleted herein for the sake of conciseness and readability but are properly within the scope of the following claims.

We claim:

1. A filtration system comprising:

(a) a feed supply for providing a feed solution;

(b) a feed pump connected to said feed solution;

(c) a cross-flow membrane filter connected downstream of said feed pump for separating said feed into a permeate and retentate, said cross-flow membrane filter including at least two membrane ports, which are connected to said feed supply and said feed pump to provide said feed solution to said feed solution to said filter and to collect retentate therefrom, and at least two permeate outlets, which are each selectively connectable to a permeate receptacle for the collection of said permeate;

(d) a valve manifold assembly located between said feed pump and said membrane ports of said cross-flow membrane filter for selectively reversing the flow of said feed solution through said membrane ports of said cross-flow membrane filter; and (e) a tertiary valve assembly for selectively connecting each of said permeate outlets to said permeate receptacle for controlling the direction of permeate flow across the permeate side of the membrane.

2. The filtration system of claim 1 further including a control system for controlling said valve manifold to selectively reverse the flow of said feed through said cross-flow membrane filter.

3. The filtration system of claim 2 wherein said control system includes a plurality of valve actuators for operating a valve in said valve manifold.

4. The filtration system of claim 2 wherein said control system operates said valve manifold in response to a predetermined process set point.

5. The filtration system of claim 4 wherein said set point is a predetermined time for feed flow across said membrane in a selected direction.

6. The filtration system of claim 4 wherein said set point is a predetermined permeate flux level.

7. The filtration system of claim 6 further including means for measuring the permeate flux level downstream from said cross-flow membrane filter.

8. The filtration system of claim 1 wherein one of said permeate outlets is located adjacent one of said cross-flow membrane filter ports.

9. The filtration system of claim 1 wherein the other one of said permeate outlets is located adjacent to the other of said cross-flow membrane filter ports.

10. The filtration system of claim 1 wherein said cross-flow membrane filter is a tube and shell membrane filter.

11. The filtration system of claim 10 wherein said cross-flow membrane filter is an ultrafiltration membrane filter of the type selected from the group consisting of plate and frame and spiral-wound.

12. The filtration system of claim 1 wherein said valve manifold assembly includes a primary directional valve assembly and at least two secondary directional valve assemblies, wherein each of said at least two secondary directional valve assemblies is located between said primary directional valve assembly and one of said membrane ports of said cross-flow membrane filter.

13. The filtration system of claim 12 wherein said primary valve assembly is a single multiple position valve.

14. The filtration system of claim 12 wherein said primary valve assembly includes a plurality of single position valves.

15. The filtration system of claim 12 wherein at least one of said secondary directional valve assemblies is a single multiple position valve.

16. The filtration system of claim 12 wherein at least one of said secondary directional valve assemblies includes a plurality of single position valves.

17. The filtration system of claim 12 further including means for coupling said primary directional valve assembly to at least one of said secondary directional valve assemblies, wherein the operation of said primary directional valve assembly causes a corresponding operation of said secondary valve assembly.

18. The filtration system of claim 17 wherein said means for coupling includes a common valve operating shaft on which said primary directional valve assembly and at least one of said secondary valve assemblies are mounted.

19. The filtration system of claim 17 wherein said means for coupling comprises a linkage between said primary directional valve assembly and at least one of said secondary valve assemblies.

* * * * *